Feb. 20, 1923.

M. P. OSBOURN 1,445,794

VALVE MECHANISM FOR STEAM ENGINES

Filed June 5, 1919 — 6 sheets-sheet 1

INVENTOR
Millard P. Osbourn.

WITNESS
F.J. Hartman

BY
Blount & Moulton
ATTORNEYS

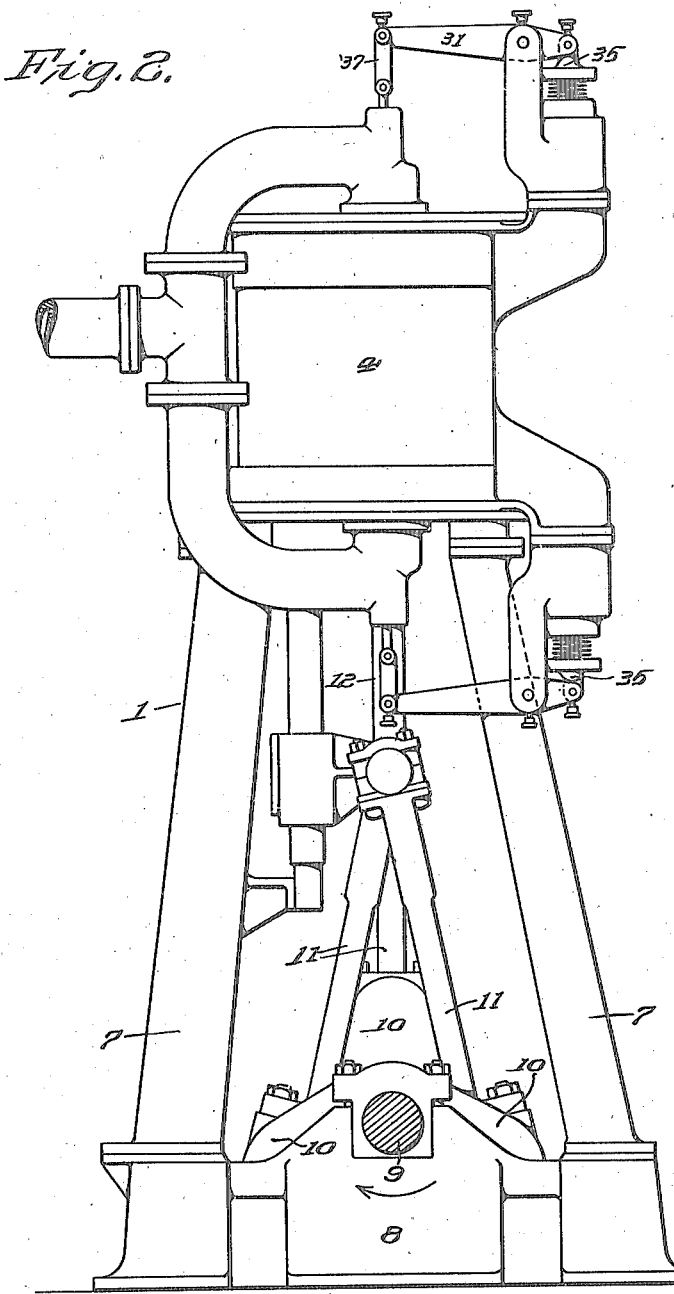

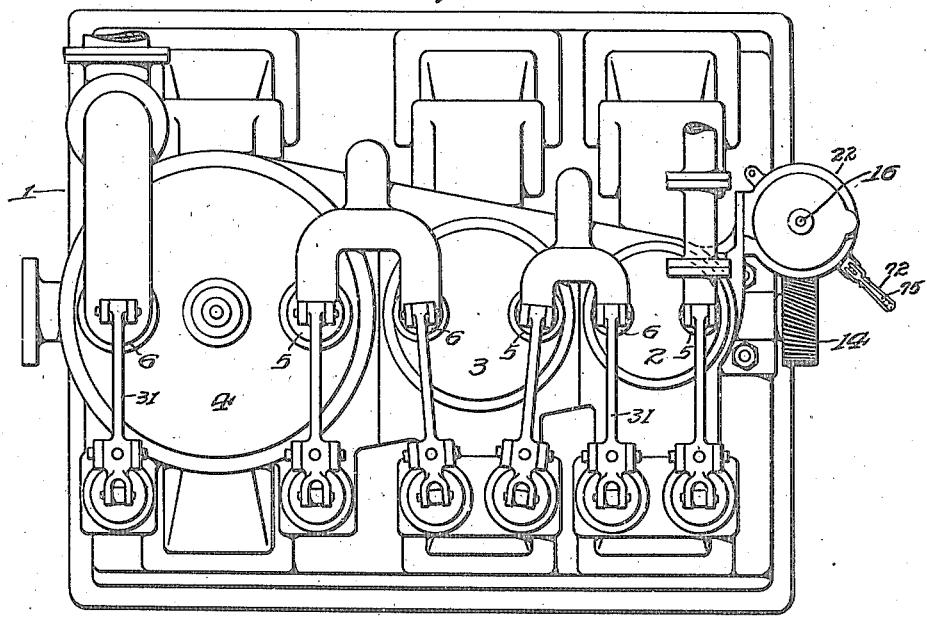

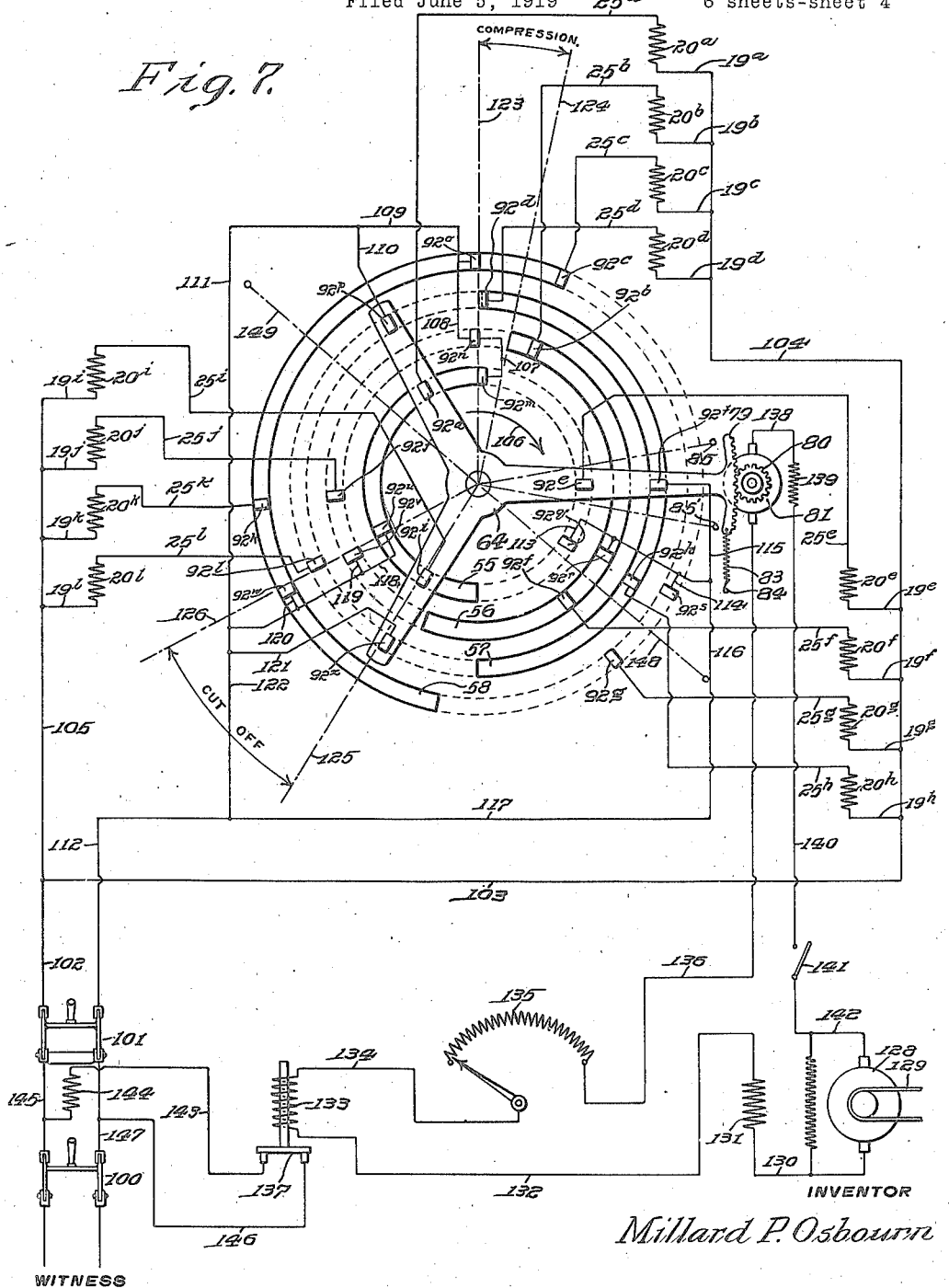

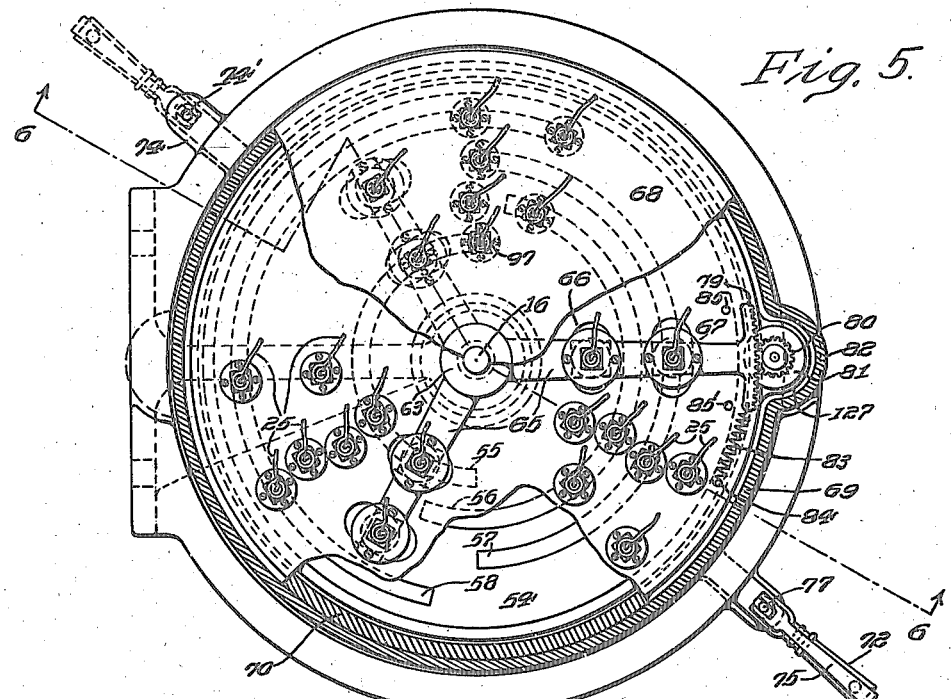

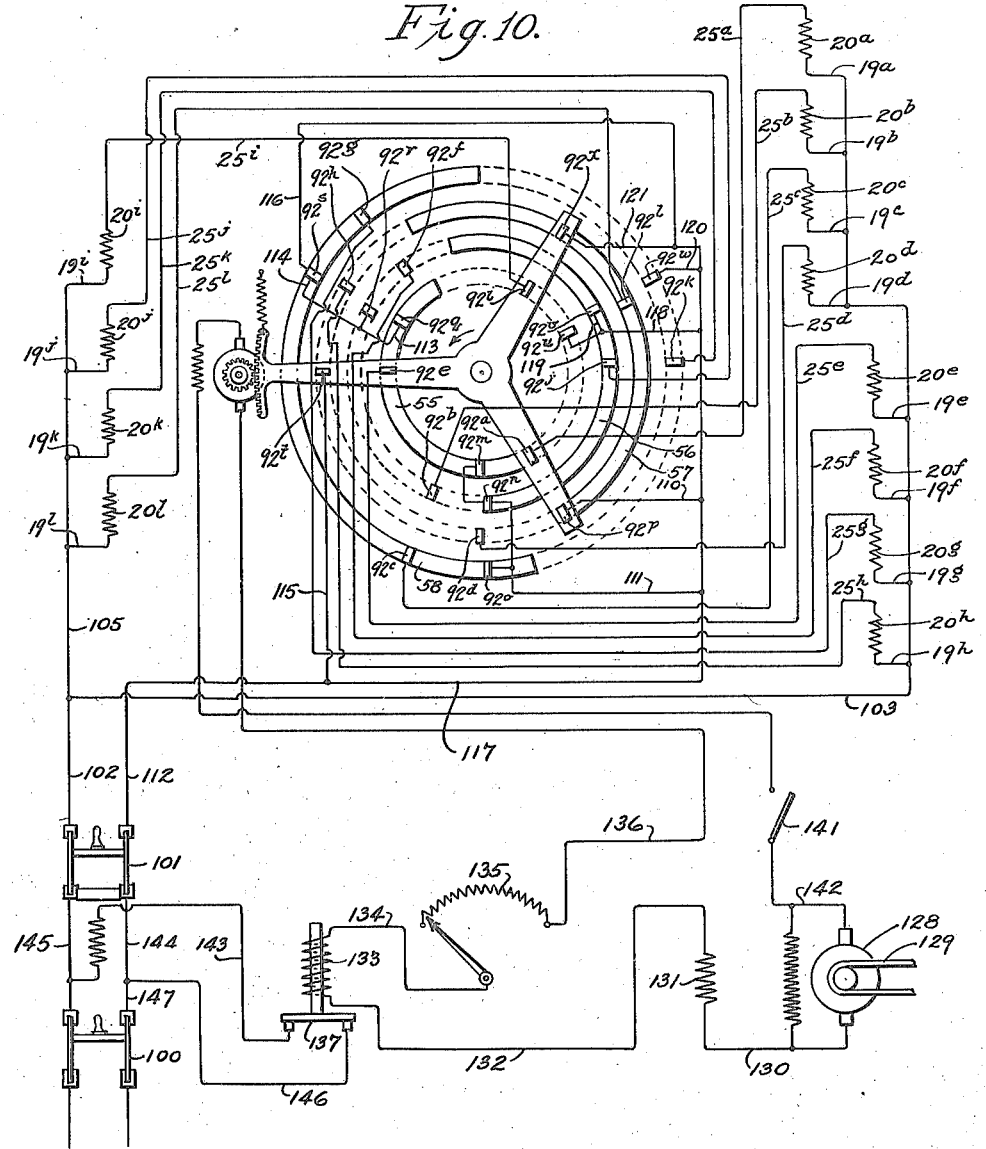

Patented Feb. 20, 1923.

1,445,794

UNITED STATES PATENT OFFICE.

MILLARD P. OSBOURN, OF PHILADELPHIA, PENNSYLVANIA, ASSIGNOR OF ONE-HALF TO JOHN P. BADENHAUSEN, OF PHILADELPHIA, PENNSYLVANIA.

VALVE MECHANISM FOR STEAM ENGINES.

Application filed June 5, 1919. Serial No. 301,962.

*To all whom it may concern:*

Be it known that I, MILLARD P. OSBOURN, a citizen of the United States, and a resident of the city of Philadelphia, county of Philadelphia, and State of Pennsylvania, have invented certain new and useful Improvements in Valve Mechanism for Steam Engines, of which the following is a specification.

My invention relates to a valve mechanism or system employed preferably upon a steam engine. For the purpose of more clearly illustrating an adaptation thereof, I have herein described, and shown in the accompanying drawing, the same in connection with a triple expansion marine steam engine.

One of the objects of my invention is, therefore, to construct and apply a controlling means for operating the various valves employed in a steam engine of the type above referred to.

Another object is to employ electro-magnetic means for controlling the operation of the valves hereinabove referred to.

Another object is to provide a means that will more quickly and accurately operate the valves of the engine.

Another object is to construct a special form of electrical current distributing means for controlling the time relation of the opening and closing functions of the valves as well as the duration of opening of the valves.

Another object is to provide the current distributing device with a speed controlled means for automatically varying the duration of opening of certain of the valves, particularly the admission valves, and also means for automatically bringing the engine to a stop in the event of accident thereto.

Another object is to provide the controlling device with reversing means whereby the engine may be quickly and readily reversed at the will of the operator.

Another object is to so construct the mechanism for operating the valves of the steam engine whereby a greater economy of space is obtained with an increased saving of cargo space on shipboard, by reason of the new valve controlling means occupying less space than the mechanical type of valve gear, as well as an economy in material with the accompanying advantage of less wear and frictional losses and the consequent saving of lubricating material.

Such other useful objects and advantages as flow from my invention will be disclosed from the following specification.

In the type of marine engine mentioned, the valve gear heretofore found essential in the operation of such engine, occupies considerable space, comprises a very large number of mechanical parts, involving undue frictional wear, and also adds considerably to the weight of the engine. With my invention, however, it is possible to dispense with such cumbersome structure and to gain practically all of the space that has been heretofore occupied by the mechanical form of valve gear, with a result that the engine, in total, will occupy but substantially two-thirds of the space previously occupied by the same engine employing the old form of valve gear.

I accomplish the result mentioned above by utilizing electro-magnetic means of control for operating each valve on the engine with the use of comparatively very few parts.

Referring to the accompanying drawing forming a part hereof and in which the same reference characters refer to the corresponding parts in the several views;

Fig. 2 is an end view in elevation of the same;

Fig. 3 is a top plan view of the same;

Fig. 4 is a detail sectional view of the electro-magnetic valve actuating means and a valve device;

Fig. 5 is a top plan view of the electric circuit controlling device with parts broken away to more clearly show the same;

Fig. 6 is a vertical sectional view taken on line 6—6 of Fig. 5;

Fig. 7 is a diagrammatic plan view of an electrical system of control that may be used in this invention;

Fig. 8 is a detail sectional view of one of the commutator brushes;

Fig. 9 is a similar view of one of the brushes controlled by the speed responsive device;

Fig. 10 is a diagrammatic plan view of the electrical system of control similar to Fig. 7 but showing the arrangement for operating the engine in reverse direction.

Figure 1:
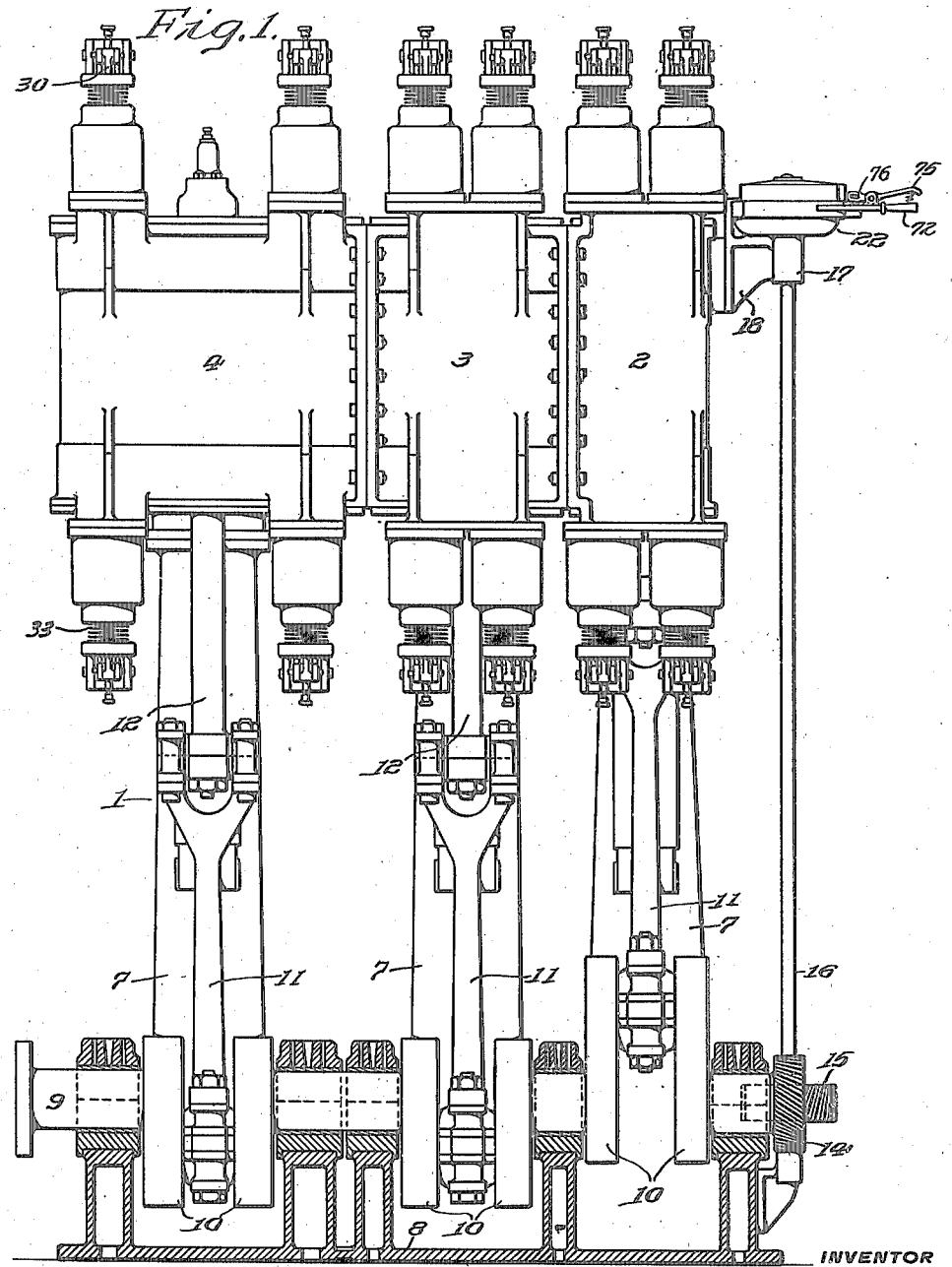
Fig. 1 is a vertical side elevation of an engine equipped with my invention.

The invention relates to valve operating mechanism for power units such as steam engines, internal combustion engines and so forth, and for illustration of one mode of application of my invention I have herein described and shown upon the accompanying drawing such invention as applied to a marine engine of the triple expansion type but it is to be understood, however, that the invention is equally adapted for use in operating valves for any other type of engine, whether stationary or locomotive, steam or gas and so forth.

In the form or type of engine selected to illustrate one application of my invention I have shown a marine engine 1 comprising a high pressure cylinder 2, a medium pressure cylinder 3 and a low pressure cylinder 4, each provided at both ends thereof with steam admission valves 5 and exhaust valves 6. The engine cylinders are supported upon suitable frame members 7 at a suitable distance above the bed 8 all of which structure is of a well known construction. The engine bed serves to rotatably support the crank shaft 9 which is suitably provided with the cranks 10. Connecting rods 11 suitably connect said cranks 10 with the piston rods 12. The inner ends of said piston rods are connected to pistons 13 included in each of said cylinders.

For the purpose of controlling the opening and closing movements of the valves I have provided the end of the crank shaft 9 at one side of the engine with a spiral gear 14 enmeshed with the spiral gear 15 secured to the lower end of the vertical shaft 16. The latter extends to the upper portion of the engine through a bearing sleeve 17 forming a part of a bracket 18 rigidly secured to the side of the engine with the extremity of said shaft operating in the commutator casing 22 where the electrical current is adapted to be distributed to the various valve operating mechanism in a manner hereinafter more fully disclosed. The electrical leads 19 and 25 leading to and from the respective valve controlling coils are suitably encased in tubes or pipes 21 to protect the same in a manner well known in the art. These electrical leads 19 and 25, electrically connected through the coils 20 and the commutator, may be connected to any suitable source of energy, such as a generator, (not shown) located at any part of the ship and driven from any power source.

Referring to Fig. 4 I have shown therein an electro-magnetic control means mounted upon a bracket 27 suitably formed integral with the engine casing. This electro-magnetic device, for each of the valves, comprises an iron armature 28 secured to said bracket and with a portion of said armature projecting into the space formed within the electrical coil 20. Opposite the end of this armature and also within the interior of said coil 20 is adapted to reciprocate an apertured iron core 29 pivotally connected at one end thereof to a link 30. A tubular sleeve 23 of non-magnetic material, such as brass or the like, may be interposed between the coil 20 and the core 29 and armature 28, for protecting the coil 20, the latter being also suitably housed or encased in the casing 24. The other end of the link 30 is pivotally connected to an end of the lever 31 suitably fulcrumed upon the upstanding posts 32 rigidly mounted upon the brackets 27. The end of the lever, to which the link 30 is connected, is in the form of a bifurcation or fork between the forked portions of which the upper end of the link 30 is located for its pivotal connection to said lever. The upper end of the casing 24 is surmounted by a coiled or helical spring 33, the lower end of which bears against said casing 24 and the upper end against the cap 34. The cap 34 is provided upon its upper surface with contact projections 35 adapted to engage with the sides of the forked or bifurcated portions of the lever 31. The core 29 is provided with a passage 36 leading to the check valve chamber 35. In the latter may be located a ball check valve 26 adapted to close against the seat 26' but prevented from closing the end 36' of the passage 36 by the interposed spider plate 25'. Oil is usually provided in the space between the ends of the core 29 and the armature 28 for the purpose of checking the relative approach of these two members at the end of the stroke of the core 29, the oil being also effective to prevent adhesion of the adjacent surfaces of the core and armature as well as providing for lubrication of the relatively movable parts.

The passage 36 combined with the chamber 35 offers a space in which may be included a cushioning medium such as air. As soon as the coil 20 is energized and the core starts to approach the armature the air in the gap therebetween is immediately compressed and seeks escape through the passage 36 and chamber 35. This effects a closing of the check valve 26 whereby the air is compressed. As the core approaches the end of its stroke it contacts with oil 86 with the result that the latter is forced into the passage 36 further compressing the air therein and rapidly augmenting the compressing action so as to prevent the end of the core pounding against the end of the armature. Upon reverse movement of the core, the check valve immediately opens to permit air to enter the chamber 35, passage 36 and the space between the core and armature thereby destroying any tendency to produce a vacuum between the same.

The other end of the lever 31 is pivotally connected to the ends of a pair of links 37, the other ends of these links being pivotally connected to a cross-head member 38 adjustably secured in any suitable manner to the valve stem 39.

The other end of the valve stem is provided with a poppet valve 40 adapted to control the admission or exhaust port 41 at the end of the engine cylinder. At the rear of the valve and suitably spaced therefrom, may be provided a chambered member 42 in which is adapted to reciprocate a piston 43 suitably secured in any well known manner to the valve stem 39 by the connection 44. The space in the chamber 42 may be connected to the interior of the engine cylinder by means of the passage 45 in order that the piston 43 and the valve 40 may act together as a balanced valve.

The valve stem 39 may be provided with a suitable labyrinth water packing comprising a number of water ring packing grooves 46 for suitably packing the same against leakage of steam in its reciprocation through the extension 47 of the casing 42. For the purpose of draining for any leakage from the packing space a connection 48 from the condenser to the annular space 49 in the extension 47 may be additionally provided to conduct fluid therefrom to the condenser.

Referring now more particularly to Figures 5 to 9 inclusive, the end of the shaft 16, projecting into the casing 22, is suitably secured by means of a key 50 to the hub 51 of a commutator member 52. The latter is in the form of a circular shallow pan, between the hub 51 and the rim 53 of which is provided an annular channel or trough in which is disposed insulating material 54 of any suitable kind, such as bakelite. In the surface of the bakelite are set or embedded metal arc shaped segments 55, 56, 57 and 58 with the top flat faces thereof coincident with the top flat surface of the bakelite annulus. These segments constitute the current closing elements for the circuits of the electro-magnets for the top inlet valves, the top exhaust valves, the bottom inlet valves and the bottom exhaust valves respectively. These segments are provided, at the lower edges thereof, with the dove-tailed portions 59 by which they may be more securely maintained in position in the bakelite. Above the commutator member 52 is supported a brush plate 60, in the hub 61 of which the end of the shaft 16 is adapted to freely rotate, this plate being normally held stationary in one of two positions. At various points in this plate are provided a plurality of apertures through which depend the brush members 62, the brushes being located so as to contact with the segments 55, 56, 57 and 58 as the latter are rotated in a circular path about the axis of the shaft 16. Above the brush plate and resting upon it, by way of the hub 63, is also located a spider 64 also freely mounted upon the shaft 16 and free to rotate relative thereto. Each of the arms 65 of the spider carries two brush members 66 and 67, these brush members being positioned upon these arms so as to respectively contact with the segments 55 and 57 for the purpose of controlling the circuits to the operating devices of the inlet valves, as more fully hereinafter appears. Above the spider is supported, by way of the hub 68', a cover 68, the top portion of which is provided with a depending flange 69 adapted to surround and encase the brushes, the spider and the brush plate. It will be noted also that the brush plate 60 is also provided with a depending flange 70 adapted to surround the rim 53 of the commutator to also protect the latter. The lower portion 71 of the casing 22 is integrally formed with the sleeve 17 and the bracket 18, is of cup shape and rises to a height to over-lap the lower edge of the cover 68, thereby also protecting the commutator and its parts. As indicated above, the commutator alone is keyed to the shaft for the purpose of rotating positively therewith, while the other members fit loosely upon the shaft. The brush plate 60 is ordinarily held in stationary position as shown in Fig. 5. To maintain such plate in position and yet permit it to be moved when it becomes necessary to reverse the engine the plate 60 is provided with a rigid arm 72 by which the plate may be angularly shifted 180° about the axis of the shaft 16 from the position shown in Fig. 5, in a counter-clockwise direction, to the position shown in dotted lines for the purpose of positioning the brushes for the reversal of the engine as desired. The edge of the cup portion 71 of the casing is provided at one side thereof with a guide slot 73 in which the arm 27 may be reciprocably guided and at both ends of which are provided the ears 74 made integral with the cup portion 71, said ears having the depressions 74'. The arm 72 has pivotally supported thereon a thumb lever 75 which is provided at one end thereof with slots 76 in which is supported a T-shaped locking pin 77 which is adapted to be raised or lowered by the movement of the lever 75 so as to introduce or withdraw the lower end of the locking pin into or from the depressions 74' thereby locking or unlocking the position of the arm in either of the two positions mentioned above. The other end of the lever 75 is normally pressed upwardly by means of a coil spring 78. When the plate 60 is thus shifted, all of the brushes supported thereby are moved angularly about the axis of the shaft 16 from the position previously occupied for the purpose of reversing the operation of the engine.

The spider 64, however, while loosely fitted to the shaft 16 is not held stationary as in the case of the main brush plate 60, but has a certain amount of angular motion about the axis of the shaft 16. One of the arms 65 is provided at its end with an arc shaped rack 79 with which is adapted to engage a pinion 80 of a torque motor 81. This torque motor is rigidly mounted upon the brush plate 60 at the periphery thereof, and the flange 69 of the cover 68 is provided with a lateral portion 82 adapted to suitably encase said torque motor 81. One end of the rack 79 may have secured thereto an end of the coil spring 83, the other end of said spring being suitably fixed to a pin 84 rigidly mounted in the brush plate 60. When the torque motor rotates the pinion 80 in one direction, the rack 79 will be caused to swing against the expansion of said spring 83, and when rotated in the opposite direction the spring 83 is effective to draw the rack 79 back. The brush plate 60 is also provided with the stop pins 85 and 85' adapted to limit the movement of the arm 65 so that the rack 79 will not disengage from the pinion 80 of the torque motor 81. Whenever the torque motor is de-energized the spring 83 will be adapted to swing the arm 65 back to a position where it may contact the pin 85'. These arms 65 each carry the brushes 66 and 67 which control the circuits to the admission valves. The torque motor operates to shift these brushes so as to control the duration of the opening of said admission valves as is more clearly hereinafter disclosed.

The brushes that are supported by the brush plate 60 are each constructed with sleeve portions 87, of insulating material, suitably provided with a flange 88 at one end to rest against the top surface of the plate 60 and provided at the other end with a fibre disc 89 contacting the undersurface of said plate and also suitably secured to the sleeve 87 by screws 90. (See Fig. 8.) The inside of the sleeve is provided with a passage which is square in cross section and has a flanged bushing 91 through which is adapted to freely slide the brush contact piece 92. The brush contact piece 92 is normally urged downwardly with its end against the top surface of the commutator and the metal segments by means of a coil spring 93 with one end of said spring pressing against the upper end of each brush contact piece and the other end of the spring reacting against the upper portion of a flanged cap 94. Both the flanged cap 94 and the bushing 91 are secured by their flanges to the insulating member 87 by means of screws 95. A wire terminal or lead 25 passes through the perforation 96 provided in the cap 94 and is secured, as by soldering, brazing or by any other well known method of connecting, to the upper end of the brush, said lead passing through the coil spring 93 and upwardly through the perforation 96. In the space provided between the brush plate 60 and the cover 68 the lead may be suitably coiled, if desired, to allow for any slight relative movement between the plate 60 and the cover 68 as might occur. The leads 19 then pass through insulating thimbles 97 provided in the cover 68, the thimbles thereby protecting the leads from the metal parts of the cover. These leads 19 each lead to the respective valve operating means hereinbefore described.

The brushes that are supported upon the arms of the spider are similar in construction to the brushes supported in the brush plate 60 with the exception that the sleeve member 87' may be somewhat longer, and, in order to prevent its movement relative to the spider arm, a spacing member 98 may be interposed between the undersurface of the spider arm and the edges of the disc 89'. These brushes depend from the arm through arc shaped slots 99 provided in the plate 60 so as to permit relative movement between the spider brushes and said plate within the angular movement imposed upon the spider by the torque motor referred to above.

Referring to Fig. 7 which shows in a diagrammatic way a complete wiring diagram for the electric system of control, the commutator segments 55, 56, 57 and 58 are shown in top plan view and in full lines and are located beneath the spider 64. The electrical brushes are shown in their relative positions by suitable rectangular representations.

The electrical energy or current may be supplied from any suitable source and transmitted to the several electro-magnets and brushes through the main switch 100 and a circuit breaker switch 101. The current may be conveyed from the switch 101 over the main wire 102, wire 103, wire 104, leads $19^a$, $19^b$, $19^c$ and $19^d$ to the respective coils $20^a$, $20^b$, $20^c$ and $20^d$ of the electro-magnets respectively controlling the top admission valve, the top exhaust valve, the bottom exhaust valve and the bottom admission valve for the high pressure cylinder, thence over the respective leads $25^a$, $25^b$, $25^c$ and $25^d$ to the respective brush contacts $92^a$, $92^b$, $92^c$ and $92^d$; the current may be conveyed also from the main wire 102 over the wire 103, leads $19^e$, $19^f$, $19^g$ and $19^h$ to the coils $20^e$, $20^f$, $20^g$ and $20^h$ of the electro-magnets respectively controlling the top admission valve, the top exhaust valve, the bottom exhause valve and the bottom admission valve for the medium pressure cylinder, thence over the leads $25^e$, $25^f$, $25^g$ and $25^h$ to the respective brush contacts $92^e$, $92^f$, $92^g$ and $92^h$, and the current may be also further conveyed from the main wire 102 over the wire 105 and leads $19^i$, $19^j$, $19^k$ and $19^l$ to the respective coils $20^i$, $20^j$, $20^k$ and $20^l$ of the electro-magnets respectively controlling the top admission valve, the top exhaust valve, the bottom exhaust valve and the bottom admission valve for the low pressure cylinder, thence over the respective leads 25$^i$, 25$^j$, 25$^k$ and 25$^l$ to the respective brush contacts 92$^i$, 92$^j$, 92$^k$ and 92$^l$.

The commutator with the bars 55, 56, 57 and 58 rotate in the direction indicated by the arrow 106 and follow the paths represented by the circular dotted lines. These metal contact bars 55, 56, 57 and 58 serve to electrically close the gaps between the brush contacts 92$^a$ and 92$^m$, 92$^b$ and 92$^n$, 92$^c$ and 92$^o$, 92$^d$ and 92$^p$, respectively for the high pressure cylinder 92$^e$ and 92$^q$, 92$^f$ and 92$^r$, 92$^g$ and 92$^s$, 92$^h$ and 92$^t$, respectively for the medium pressure cylinder; and 92$^i$ and 92$^u$, 92$^j$ and 92$^v$, 92$^k$ and 92$^w$, 92$^l$ and 92$^x$ respectively for the low pressure cylinder. The contacts 92$^m$, 92$^n$, 92$^o$, and 92$^p$ are connected to each other by the wires 107, 108, 109 and 110 and to the return wire 111 to the main wire 112 connected to the other side of the switch 101 from that to which the main wire 102 is connected; the contacts 92$^q$, 92$^r$, 92$^s$ and 92$^t$ are similarly connected to each other by wires 113, 114, 115 and 116, and to the return wire 117 to the main wire 112, and the contacts 92$^u$, 92$^v$, 92$^w$ and 92$^x$ are similarly connected together by the wires 118, 119, 120 and 121 and to the return wire 122 to the main wire 112. The above description relates to the completion of all of the respective circuits.

With the parts in the position shown in Fig. 7 the relation of the segment bars and the brush contacts are such that the piston in the high pressure cylinder is moving upwardly toward the end of its stroke prior to being reversed and at this instant the contact segment 55, which is in contact with the brush contact piece 92$^a$, has just made contact with the brush contact piece 92$^m$ for closing the gap between the pieces 92$^a$ and 92$^m$ whereby the circuit for the coil 20$^a$ will be closed and the upper admission valve for the high pressure cylinder will be opened. This valve will remain open until the contact segment 55 is rotated to the position where its trailing end will break contact with the brush contact piece 92$^a$, whereupon the admission valve will be closed and further admission of the steam prevented. The point at which the trailing end of the segment 55 parts from the piece 92$^a$ may be properly termed the "cut-off" point. It will be noted that a certain angle is represented between the lines 123 and 124 designated as the "compression" angle. This graphically represents the angle through which the commutator segments move, as for example, the trailing end of segment 56 moves after parting from the contact piece 92$^n$ to the line 124 at which latter position the piston is at "dead center" and about to reverse with the leading end of the segment 55 about to contact with the contact member 92$^m$ to close the admission circuit, the angle between lines 123 and 124 representing the amount of compression and the time during which the exhaust valve is closed before the opening of the admission valve. Similarly, the angle between the lines 125 and 126 may be termed the "cut-off" angle, that shown in Fig. 7 having reference to the low pressure cylinder, but similar angles, of course, apply to the other cylinders. This angle, for each cylinder, is, however, variable to the extent of the movement of the spider 64 and the brush contact pieces carried thereby. The amount of admission is dependent upon the inverse ratio of said "cut-off" angle to the included angle of the admission segment (substantially 180° in this case). Inasmuch as the included angle of the admission segments is a constant it is apparent that the "cut off" or the time during which the steam is "cut off" and expanding, is conveniently graphically represented by the magnitude of the angle referred to, or on the other hand, the amount of admission or the time during which the steam is being admitted is inversely to the angular magnitude of said angle.

With the parts, as shown in Fig. 7, it will be observed that for the medium pressure cylinder, the upper admission valve is closed by reason of the fact that the gap between the contact pieces 92$^e$ and 92$^q$ is open, the segment 55 being out of contact therewith, and in the case of the low pressure cylinder the upper admission valve is open but is to shortly close as the trailing end of the segment 55 parts from the contact piece 92$^i$ thereby opening the gap between the contact pieces 92$^i$ and 92$^u$.

The segment 56 controls the opening of the upper exhaust valves for all the cylinders. In the position of the parts shown in Fig. 7, the upper exhaust valve for the high pressure cylinder has been closed, since the trailing end of the segment 56 has parted contact with the piece 92$^n$ of the circuit controlling the coil 20$^b$ for such valve. The upper exhaust valve for the medium pressure cylinder is open by reason of the segment 56 closing the gap between the contact pieces 92$^f$ and 92$^r$ of the circuit controlling the coil 20$^f$ for such valve. The upper exhaust valve for the low pressure cylinder is closed since the segment 56 does not close the gap between the contacts 92$^j$ and 92$^v$ of the circuit controlling the coil 20$^j$ for such valve. It may be seen, however, that as the segment 56 rotates its leading end will soon reach the contacts 92$^v$ and 92$^j$ whereupon the circuit will be closed and this exhaust valve opened.

Similarly the segment 57 is adapted to successively close and open the gaps between the contacts 92$^x$ and 92$^l$, 92$^p$ and 92$^d$, and 92$^t$ and 92$^h$ for respectively controlling the circuits of the coils 20$^l$, 20$^d$ and 20$^h$ for the lower or bottom admission valves, of the low pressure cylinder, high pressure cylinder and medium pressure cylinder respectively.

Similarly the segment 58 is adapted to successively close and open the gaps between the contacts 92$^o$ and 92$^c$, 92$^s$ and 92$^g$, and 92$^w$ and 92$^k$ for respectively controlling the circuits of the coils 20$^c$, 20$^g$ and 20$^k$ for the lower or bottom exhaust valves of the high pressure cylinder, medium pressure cylinder and low pressure cylinder respectively.

For the purpose of varying the "cut-off" or the duration of the admission the commutator device comprises the spider 64 upon the arms of which are carried the brushes 66 and 67 in which, at the various points, are located the brush contact pieces 92$^a$, 92$^p$, 92$^e$, 92$^t$, 92$^l$ and 92$^x$. These pieces are located over the segments 55 and 57 so that the same in their rotation may be adapted to control the circuits for the admission valves, as hereinbefore described. If, however, the spider be given a certain amount of angular movement in the direction of the arrow 106, from the position now shown in Fig. 7, it will be observed that as the segments 55 and 57 pass underneath these contact pieces, the trailing ends of the segments 55 and 57 will part connection with the contact pieces 92$^a$ and 92$^p$ for the high pressure cylinder, 92$^e$ and 92$^t$ for the medium pressure cylinder and 92$^l$ and 92$^x$ for the low pressure cylinder, later than if such spider had remained in the position shown in Fig. 7, thereby lengthening the time during which the admission valves are maintained open. On the other hand, however, if the spider be angularly moved from the position shown in Fig. 7 in a direction opposed to the arrow 106 it may be seen that the trailing ends of the segments 55 and 57 will part connection with the contact pieces 92$^a$, 92$^p$, 92$^e$, 92$^t$, 92$^l$ and 92$^x$ earlier than if such spider had remained in the position shown in Fig. 7. In this way, by varying the position of the spider and the contacts carried thereby the amount of admission and the time of cut-off may be varied accordingly.

For the purpose of controlling the movement of the spider the invention comprehends the idea of using a torque motor of any suitable type mounted upon an extension 127 on the periphery of the brush plate 60. The torque motor may be connected to a small compound wound generator 128 positively driven by the crank shaft 9 of the engine in any suitable manner, as by a chain or belt 129. The torque motor may be so constructed that its torque is proportional to the speed of rotation of the generator, and consequently, to that of the engine. The circuit of the torque motor leads from the generator 128 through the wire 130, series coil 131, wire 132, to a relay coil 133, wire 134, rheostat 135, wire 136, torque motor 81, wire 138, resistance 139, wire 140, manually controlled switch 141, wire 142, back to the generator 128. With this arrangement, as the speed of the engine varies from normal the torque motor will operate to cause the pinion 80 to oscillate the rack 79 and the spider 64, accordingly. This will give the contact pieces 92$^a$, 92$^p$, 92$^e$, 92$^t$, 92$^l$ and 92$^x$ an angular movement either nearer to or further from the respective brush contact pieces 92$^m$, 92$^d$, 92$^q$, 92$^h$, 92$^u$, and 92$^i$. In the event the speed of the engine is below normal, these contacts as above indicated, will be advanced in the direction of the arrow 106 to a position where the trailing ends of the segments 55 and 57 will break circuits in retarded time relation thereby increasing the time during which the admission valves remain open. If, on the other hand, the speed of the engine is above normal the torque motor will operate to angularly rotate the spider in a reverse direction from that shown by the arrow so that the contact pieces will be at a greater distance apart whereby the trailing ends of the segments 55 and 57 will break the circuits in hastened time relation thereby shortening the period during which the admission valves are open.

It is to be understood, however, that I do not consider my invention limited to an electrical speed responsive means but that any other suitable device mechanical or otherwise, may be used.

If for any reason, such as the breaking of a shaft or due to some other serious accident to the engine, when the engine would be caused to race at an extremely high or dangerous speed, means is provided here to totally shut off the supply of energy to the engine. Such means may be controlled by the generator 128 when such excessive speed is reached, the current generated by the generator 128 becoming sufficient to effect, through the relay coil 133, the opening of the relay switch 137 to open the shunt circuit including the wire 143, circuit breaker coil 144 and the wire 145 comprised in the main line wire 102 and also including the wire 146 connected to the wire 147 comprised in the main line return wire 112. This circuit is normally closed and the coil 144 is normally maintained energized so as to maintain the circuit breaker latch in lock position but when the current in this shunt circuit is opened by the relay switch 137, the coil 144 is thus de-energized and the circuit breaker permitted to open the main line circuit, thereby de-energizing all of the electromagnets 20 connected to the valves of the engine and preventing any further supply of steam thereto. This results in the shutting down of the engine.

The function of the torque motor is for automatically controlling the supply of steam to the various cylinders, under the normal variations in speed of the engine. This may be important where a ship is navigating on a stormy sea, where the ship is heavily pitched and the propeller is lifted out of the water. At such instant the engine tends to race but the torque motor will shift the spider with the admission contacts so as to immediately shorten the admission of steam. As soon as the propeller is again dropped into the water the load suddenly thrust upon the engine will immediately reduce its speed which will effect the torque motor to shift the spider with the admission contacts in the opposite direction so as to immediately increase the time of admission of the steam. The torque motor will act very quickly and sensitively. The motion given to the spider will be in synchronism with the movement of the propeller in and out of the water. The use of the torque motor, however, is not limited to this particular situation, but the above is pointed out as an example of a circumstance that may be met with by the present invention.

On certain occasions, such as when docking a ship or otherwise managing it, it becomes necessary to run the engine in the reverse direction and for this operation the invention involves the use of a very simple reversing means. This comprises merely the handle 72 secured to the brush plate, hereinbefore described. For reversing, it is necessary to merely shift the brush plate 60 and the spider 64, with all of the brushes carried thereby, as well as the torque motor, from the position indicated by the line 148 180° to the position indicated by the line 149. The shifting may be in either direction but somewhat better results will be obtained if the brushes be rotated in the direction opposed to the arrow 106. It will be noted that as the brushes are so shifted the commutator is rotating in the direction of the arrow 106 but as soon as the shifting is completed the circuits will be so changed as to cause the steam to enter the cylinders at the opposite ends from that in which the engine is rotating in the normal or usual forward direction and the relation of the brush contacts to the segments will be such that as the commutator is reversed in rotation the circuits will operate the valves in proper order for the reverse rotation of the engine.

Referring to Fig. 10 it will be observed that for reversing the engine when the controlling parts are in the position shown in Fig. 7, the high pressure cylinder is substantially at dead center and consequently this cylinder cannot be relied upon at that instant to help in effecting a reversal of the engine. This would be true of all reciprocating engines. Therefore, at the instant indicated above, dependence is placed upon the intermediate and low pressure cylinders to positively start and effect a reversal of the engine and as soon as the engine is reversed the reversely rotating segments of the commutator discs will be almost immediately carried into position to change the valves of the high pressure cylinder into the condition necessary for a reverse operation thereof and consequently of the engine. It will be apparent that whatever cylinder may be on or nearly on dead center, the other two cylinders become operatively effective to reverse the engine. The cylinder which happens to be on or near dead center at that time immediately becomes effective to also add its reversing action as soon as it is moved from the dead center position due to the effect of the other two cylinders.

In Fig. 10 the position of the contacts and segments are shown when the former has been shifted 180 degrees in the direction of the arrow. Reversal will begin just as soon as the contacts change segments, that is, for example, as the contacts 92$^l$ and 92$^x$, and 92$^j$ and 92$^v$ are bridged by segments 57 and 56, respectively and contacts 92$^t$, 92$^h$, 92$^k$, 92$^w$, 92$^u$, and 92$^i$ are moved out of engagement from their respective segments onto the non-conducting material and the reverse operation of the engine shall have continued to a small extent by the time that contacts have reached the position shown in Fig. 10. Consequently, the segments, when the contacts reach such position, shall have travel counter-clockwise through a small angle from the position shown in Fig. 7 to that shown in Fig. 10 so that the bottom exhaust and the top inlet segments shall be in bridging relation with the contacts 92$^o$ and 92$^c$, and the contacts 92$^a$ and 92$^m$ respectively.

In the general operation of the apparatus the rotation of the crank shaft is imparted to the shaft 16, through the gears 14 and 15, and the commutator 52. The electrical current is distributed through the commutator and brushes in the manner hereinbefore described and transmitted successively to the respective magnetic coils 20 in the proper time relation to operate the valves in the order or sequence which will give the engine an appropriate admission and exhaust of steam thereto and therefrom in its predetermined operation. With the commutator and the brush contacts in proper relation for any one of said valve mechanisms, the current passes to the electric coil 20 thereby producing a magnetic attraction between the stationary armature 28 and the movable core 29 and consequently drawing said core toward said armature 28 against the force of the spring 33. The air and oil between the core 29 and the armature 28 being effective to check the movement of the core toward the end of its stroke in order to protect the same from injurious impact with the armature.

The movement of the core 29 is transmitted through the links 30 and the levers 31. A downward movement of said links, as viewed in Fig. 4, would cause an upward movement of the other end of the levers 31 as well as the valve stem 39 and the valve 40. Inasmuch as there is a piston 43, of substantially the same effective area as the valve 40, connected with said valve and with the chamber of the casing 42 connected by the balance passage 45 to the interior of the cylinder of the engine, a balanced valve construction is provided. In this way the effort required to open the valve is only that necessary to overcome the friction of the parts connected between the poppet valve and the core 29.

Upon the separation of any of the segments with the brush contacts the current is cut off and the electro-magnet de-energized with the result that the spring 33 is permitted to expand, thereby moving the core 29 away from the armature 28 and at the same time by means of the projections 35, pressing against the ends of the bifurcations provided at the end of the lever 31, forcing said lever to move the valve stem 39 and the valve 40 to closed position, for cutting off the admission of steam where the valve 40 is an admission valve or shutting off the exhaust in the case where the valve 40 is an exhaust valve.

As all of the valves are identical it is only found essential to describe one single valve arrangement as is shown in Fig. 4 without detailing a repetition of the structure of the other valves.

While I have shown one form of control means for operating the valves of a steam engine, it is to be understood, however, that my invention is not to be limited to the particular details herein illustrated upon the drawing and described in the specification, but comprehends such other equivalent structures as do not depart from the spirit of my invention and the scope of the appended claims.

Having thus described my invention what I claim and desire to secure by Letters Patent is:

1. In a valve mechanism for engines comprising admission and exhaust valves, the combination of a rotary commutator member actuated by said engine, angularly and radially spaced arc shaped electrical contact members connected to said rotary member and adapted to travel in concentric circular paths, angularly and radially spaced brushes adapted to contact with said contact members, means to support said brushes, an electro-magnet for each of said valves electrically connected to said brushes, movable members connected to and adapted to be moved by each of said electro-magnets when the latter are energized, connecting means between said movable members and said valves whereby said valves are opened upon the energizing of said electro-magnets, resilient means for closing and maintaining closed said valves when said electro-magnets are de-energized, said valve provided with pistons and passages whereby said valves are balanced.

2. In a steam engine provided with admission and exhaust valves, the combination of electro-magnetic means for actuating said valves and rotating commutator driven by said engine for controlling the circuits to said electro-magnetic actuating means, said commutator comprising radially spaced arc shaped contact pieces adapted to travel in concentric circular paths and angularly and radially spaced contact brushes adapted to contact with said arc shaped contact pieces.

3. In a steam engine provided with admission and exhaust valves, the combination of electro-magnetic means for actuating said valves and means driven from said engine for controlling the time of action of said electro-magnetic means said driven means comprising a rotating commutator member, radially spaced arc shaped contact pieces in said commutator member adapted to rotate therewith in circular concentric paths, a brush holder coaxial with said commutator member, angularly and radially spaced contact brushes carried by said holder for contact with said arc shaped contact pieces, an angularly movable member coaxial with said commutator member and responsive to speed variations of said engine, angularly and radially spaced contact brushes carried by said angularly movable means and adapted to contact with said arc shaped contact pieces.

4. In a steam engine provided with admission and exhaust valves, the combination of electro-magnetic means for actuating said valves and rotating means driven from said engine for controlling the time of action of said electro-magnetic means, said rotating means including an angularly movable means for changing the order of control for reversing said engine at will.

5. In a steam engine provided with a crank shaft and with admission and exhaust valves, the combination of an electro-magnet for each of said valves, a rotating commutator member provided with spaced concentric arcuate contact members, angularly and radially spaced contact brushes, said arcuate contact members adapted to bridge said angularly spaced contact brushes for distributing electrical energy to said electro-magnets, a shaft driven by said crank shaft and connected to said commutator to actuate the same, a valve stem for each of said valves, and a lever pivotally connected to each of said electro-magnets and to each of said valve stems.

6. A valve controlling device for engines comprising in combination admission and exhaust valves, electro-magnets each operatively connected with its respective valve, a rotating commutator member driven by said engine, radially spaced arc shaped contact pieces in said commutator member adapted to travel in concentric circular paths, contact brush supporting members, a plurality of angularly and radially spaced contact brushes carried by each of said supporting members and adapted to contact with said arc shaped contact pieces and electrical circuit members leading from said electro-magnets to said contact brushes.

7. A valve controlling device for engines comprising in combination admission and exhaust valves, electro-magnets each operatively connected with its respective valve, a rotating commutator member driven by said engine, radially spaced arc shaped contact pieces on said commutator member adapted to travel in concentric circular paths, contact brush supporting members, a plurality of angularly and radially spaced contact brushes carried by each of said supporting members and adapted to contact with said arc shaped contact pieces, speed responsive means adapted to cause a relative angular movement between said supporting members and the contact brushes carried thereby for varying the duration of contact between said arc shaped contact pieces and said brushes and electrical circuit members leading from said electro-magnets to said contact brushes.

8. In a steam engine provided with admission and exhaust valves, the combination of electro-magnetic means for actuating said valves and means controlled by the rotation of said engine for controlling the time of action of said electro-magnetic means, said controlled means comprising a rotating disc, insulating material in said disc, angularly and radially spaced metal contact pieces embedded in said insulating material with the surfaces of said contact pieces and said insulating material coincident, a brush holding plate coaxial with said disc and normally held in stationary position, a plurality of contact brushes carried by said plate and adapted to contact with said contact pieces at intervals, a brush holding spider provided with radial arms, contact brushes carried by said radial arms and adapted to contact with certain of said contact pieces, speed responsive means adapted to cause a relative angular movement between said brush holding plate and said brush holding spider whereby the relation of the brushes on said plate and said spider is varied in accordance with the change in speed of rotation of the engine and the duration of contact of said brushes with certain of said contact pieces is varied.

In witness whereof I hereunto set my hand this 29th day of May, 1919.

MILLARD P. OSBOURN.